United States Patent
Chunduri et al.

(10) Patent No.: US 10,432,516 B2
(45) Date of Patent: Oct. 1, 2019

(54) PSEUDOWIRE SERVICING ACROSS MULTIPLE ADMINISTRATIVE SYSTEMS USING BORDER GATEWAY PROTOCOL-LINK STATE

(71) Applicant: Futurewei Technologies, Inc., Plano, TX (US)

(72) Inventors: Uma S. Chunduri, Fremont, CA (US); Evgeny Tantsura, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 3 days.

(21) Appl. No.: 15/788,215

(22) Filed: Oct. 19, 2017

(65) Prior Publication Data
US 2019/0123999 A1    Apr. 25, 2019

(51) Int. Cl.
  *H04L 29/06*   (2006.01)
  *H04L 29/08*   (2006.01)
  *H04L 12/781*  (2013.01)
  *H04L 12/749*  (2013.01)

(52) U.S. Cl.
  CPC ............ *H04L 45/52* (2013.01); *H04L 67/147* (2013.01); *H04L 45/741* (2013.01); *H04L 69/18* (2013.01)

(58) Field of Classification Search
  CPC ....... H04L 45/52; H04L 67/147; H04L 69/18; H04L 45/741
  See application file for complete search history.

(56) References Cited

U.S. PATENT DOCUMENTS

| 8,422,514 B1 | 4/2013 | Kothari et al. |
| 2006/0182122 A1* | 8/2006 | Davie ................ H04L 12/2854 370/395.53 |
| 2007/0162614 A1* | 7/2007 | Patel ..................... H04L 45/00 709/239 |

(Continued)

FOREIGN PATENT DOCUMENTS

CN    102201971 A    9/2011

OTHER PUBLICATIONS

Gredler, et al.; North-Bound Distribution of Link-State and Traffic Engineering (TE) Information Using BGP; IETF RFC 7752; Mar. 2016; 48 pgs.

(Continued)

*Primary Examiner* — Curtis A Alia
(74) *Attorney, Agent, or Firm* — Futurewei Technologies, Inc.

(57) ABSTRACT

Servicing a pseudowire communication across multiple Administrative Systems (AS) by components of packet data networks. A first Provider Edge (PE) router of a first AS receives a first Interior Gateway Protocol (IGP) message from a source PE router of the first AS that includes pseudowire data. The first PE router creates a first Border Gateway Protocol Link State (BGP-LS) message that includes the pseudowire data and transmits the first BGP-LS message to a second PE router of a second AS and intended for a destination PE router of the second AS. The first PE router then receives a second BGP-LS message from the second PE router that includes modified pseudowire data. The first PE router creates a second IGP message that includes the modified pseudowire data and transmits the second IGP message to the source PE router.

20 Claims, 11 Drawing Sheets

(56) References Cited

U.S. PATENT DOCUMENTS

2012/0063450 A1* 3/2012 Pignataro ............... H04L 45/68
                                                    370/389
2017/0012895 A1    1/2017 Zhao et al.

OTHER PUBLICATIONS

International Searching Authority; International Search Report and Written Opinion; International Application No. PCT/CN2018/110634; dated Jan. 4, 2019; 9 pgs.

* cited by examiner

FIG. 3A — 310: TYPE | LENGTH | CAPABILITY PARAMETERS

FIG. 3B — 320: TYPE | LENGTH | CAPABILITY PARAMETERS SUB-TLVS

FIG. 3C — 330: TYPE | LENGTH | MT-ID | AF | R | FLAGS | RESERVED | 32 BIT IPv4 SOURCE IP ADDRESS | 32 BIT IPv4 DESTINATION IP ADDRESS | SUB-TLVs (VARIABLE)

FIG. 3D — 340: TYPE | LENGTH | AF | R | FLAGS | RESERVED | 128 BIT IPv6 SOURCE IP ADDRESS | 128 BIT IPv6 DESTINATION IP ADDRESS | SUB-TLVs (VARIABLE)

FIG. 4B
404

| TYPE | LENGTH |
|---|---|
| GROUP ID | |

FIG. 4C
406

| TYPE | LENGTH |
|---|---|
| STATUS CODE (CONTINUED) | |
| STATUS CODE (CONTINUED) | |
| STATUS CODE (CONTINUED) | |
| STATUS CODE (CONTINUED) | |

FIG. 4A
402

| TYPE | | | LENGTH |
|---|---|---|---|
| PW TYPE | C | | UNDEFINED FLAGS |
| | | E | PW STATUS |
| PW ID | | | |
| LABEL TLV | | | |
| ONE OR MORE INTERFACE PARAMETER SUB-TLVs | | | |

| TYPE | LENGTH 502 | | | | | |
|---|---|---|---|---|---|---|
| IF PARM TYPE | PARAM LEN | VARIABLE LENGTH VALUE | PARAM VALUE (CONT'D AS NEEDED) | IF PARM TYPE | PARAM LEN | VARIABLE LENGTH VALUE | PARAM VALUE (CONT'D AS NEEDED) |

FIG. 5

PSEUDOWIRE SERVICING ACROSS MULTIPLE ADMINISTRATIVE SYSTEMS USING BORDER GATEWAY PROTOCOL-LINK STATE

CROSS-REFERENCE TO RELATED APPLICATIONS

This application is related to U.S. patent application Ser. No. 15/481,271, filed Apr. 6, 2017, entitled "METHOD AND APPARATUS FOR PSEUDOWIRE (PW) SETUP AND MAINTENANCE USING OSPF PROTOCOL," which is incorporated herein by reference in its entirety for all purposes.

BACKGROUND

A "pseudowire" (pseudowire") is a mechanism for emulating various networking and telecommunications services across a packet-switched network (PSN). Pseudowire can be used, for example, to emulate synchronous optical networking (SONET), synchronous digital hierarchy (SDH), time-division multiplexing (TDM), structure-agnostic TDM over packet (SAToP), frame relay, asynchronous transfer mode (ATM), Ethernet over multi-protocol label switching (MPLS), and other protocols and services.

In conventional pseudowire systems, the pseudowire is configured using the targeted label distribution protocol (tLDP) or the border gateway protocol (BGP). However, using these protocols is problematic and in some cases unnecessary (especially when using certain technologies, for example, Segment Routing, where LDP is not used at all). For example, conventional pseudowire systems require one protocol for the control plane and another protocol for the data plane. Route processor switchover convergence time (RP SWO) in high available (HA) systems may be high when using LDP. Further, for in-service software upgrades (ISSUs), the pseudowire may disconnect because the line card black-out time is longer than the LDP session outage detection time. Further, BGP is not always available for use with pseudowire because of operational complexity and cost. Pseudowire links may be required to extend across a plurality of differing Administrative Systems (ASs). The prior solutions did not support end-to-end pseudowire connections that extended across two or more ASs.

SUMMARY

The present disclosure describes structures and operations for setting up and servicing a pseudowire connection between first and second Customer Equipment (CE) that extends across multiple Administrative Systems (ASs) of a Packet Data Network (PDN). A source Provider Edge (PE) router of a first AS supports the first CE and a destination PE router of a second AS supports the second CE. A first PE router of the first AS and a second PE router of the second AS bridge communications between the first AS and the second AS. Each of the first AS and the second AS also may include one or more Switching Routers (SRs) that inter-couple and route traffic for the PEs.

A first embodiment of the present disclosure addresses operations of the first PE router. The first PE router receives a first Interior Gateway Protocol (IGP) message from a source PE router, the IGP message including pseudowire data that identifies the destination PE router. In response, the first PE router creates a first Border Gateway Protocol Link State (BGP-LS) message that includes the pseudowire data and transmits the first BGP-LS message to the second PE router.

The first BGP-LS message is received by the second PE router, which it uses to create a second IGP message that includes the pseudowire data and transmits the second IGP message to the destination PE router. The destination PE router extracts the pseudowire data from the second IGP message, modifies the pseudowire data, and creates a third IGP message that includes the modified pseudowire data. The destination PE router then transmits the third IGP message to the second PE router. The second PE router receives the third IGP message and creates a second BGP-LS message that includes the modified pseudowire data and transmits the second BGP-LS message to the first PE router of the first AS. The first PE router receives the second BGP-LS message from the second PE router and creates a fourth IGP message, based upon the second BGP-LS message that includes the modified pseudowire data. The first PE router then transmits the fourth IGP message to the source PE router.

Based upon this interaction a pseudowire is initiated and serviced that extends across at least the first and second ASs. Thus, according to the present disclosure, pseudowire communications are supported that could not be supported using prior techniques. Further, according to the present disclosure, currently existing IGP and BGP-LS messaging may be modified to support carrying pseudowire data across multiple ASs to enable end-to-end pseudowires across multiple ASs.

The above described embodiment may include various aspects, which may be applied to the first embodiment (and other embodiments) singularly or in multiples. According to a first aspect, BGP-LS messages include Network Layer Reachability Information (NLRI) that includes the pseudowire data. The NLRI may carry a plurality of pseudowire Type Length Values (TLVs). These pseudowire TLVs may include one or more of, in various combinations, Pseudowire Capability TLVs, Pseudowire Sub-TLVs, Pseudowire Group ID Sub-TLVs, Pseudowire Extended Status Sub-TLVs and/or Pseudowire Parameters Sub-TLVs. These pseudowire TLVs may be consistent with IPv4, IPv6 and/or OSPF/IS-IS protocol standards. Thus, embodiments of the present disclosure build upon existing standards by extending the existing standards to support a pseudowire that extends across multiple ASs.

According to a third aspect of the first embodiment, the first PE router and the second PE router exchange BGP-LS messages using External Border Gateway Protocol (eBGP) peering. According to a fourth aspect of the first embodiment, the first PE router and the second PE router exchange BGP-LS messages using External Border Gateway Protocol (eBGP) peering via a BGP Route Reflectors (RRs) of the first and second ASs. The third and fourth aspects have the additional advantages and benefits of using existing structures and techniques as modified according to the present disclosure. Thus, embodiments of the present disclosure build upon existing structures and operations to distribute pseudowire data across multiple ASs to support end-to-end pseudowires.

A second embodiment of the present disclosure addresses the operation of the destination PE router. According to this aspect, the destination PE router of the second AS receives an IGP message from the second PE router of the second AS that includes pseudowire data. The destination PE router extracts the pseudowire data from the IGP message and determines that the source PE router, which is associated with a first AS, is different from the second PE router that is associated with the second AS. In response to this determination, the destination PE router modifies the pseudowire data and creates an IGP message that includes the pseudowire data as modified. The destination PE router then transmits the IGP message to the second PE router. The second PE router may determine the identity of the source PE router from the pseudowire data, create a north-bound BGP-LS message, and correctly route the BGP-LS message to the first PE router to enable support of a pseudowire across the first and second ASs.

Various aspects may be applied to the second embodiment singularly or in multiples. A first aspect enables the destination PE router to determine that the second PE router is not the source PE router by extracting a status bit from the pseudowire data and determining from the status bit that the source PE router is different from the second PE router. According to a second aspect of the second embodiment, the destination PE router determines that the second PE router is not the source PE router by extracting an IP address of the source PE router from the pseudowire data and comparing the IP address of the source PE router to the IP address of the second PE router. The pseudowire data may be carried consistently with the structures described with reference to the first embodiment.

A third embodiment of the present disclosure is directed to a PE router including at least one network interface, memory, and a processor coupled with the network interface and the memory, these components configured to perform operations consistent with the first embodiment.

A fourth embodiment of the present disclosure is directed to a PE router including at least one network interface, memory, and a processor coupled with the network interface and the memory, these components configured to perform operations consistent with the second embodiment.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3A is a block diagram illustrating a format for a Pseudowire Capability Type Length Value (TLV) according to a described embodiment.

FIG. 3B is a block diagram illustrating a format for a Pseudowire Capability Sub-TLV according to a described embodiment.

FIG. 3C is a block diagram illustrating a format for an IPv4 Pseudowire association TLV according to a described embodiment.

FIG. 3D is a block diagram illustrating a format for an IPv6 Pseudowire association TLV according to a described embodiment.

FIG. 4A is a block diagram illustrating a Pseudowire Sub-TLV according to a described embodiment.

FIG. 4B is a block diagram illustrating a Pseudowire Group ID Sub-TLV according to a described embodiment.

FIG. 4C is a block diagram illustrating a Pseudowire Extended Status Sub-TLV according to a described embodiment.

FIG. 5 is a block diagram illustrating a Pseudowire Parameters Sub-TLV according to a described embodiment.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
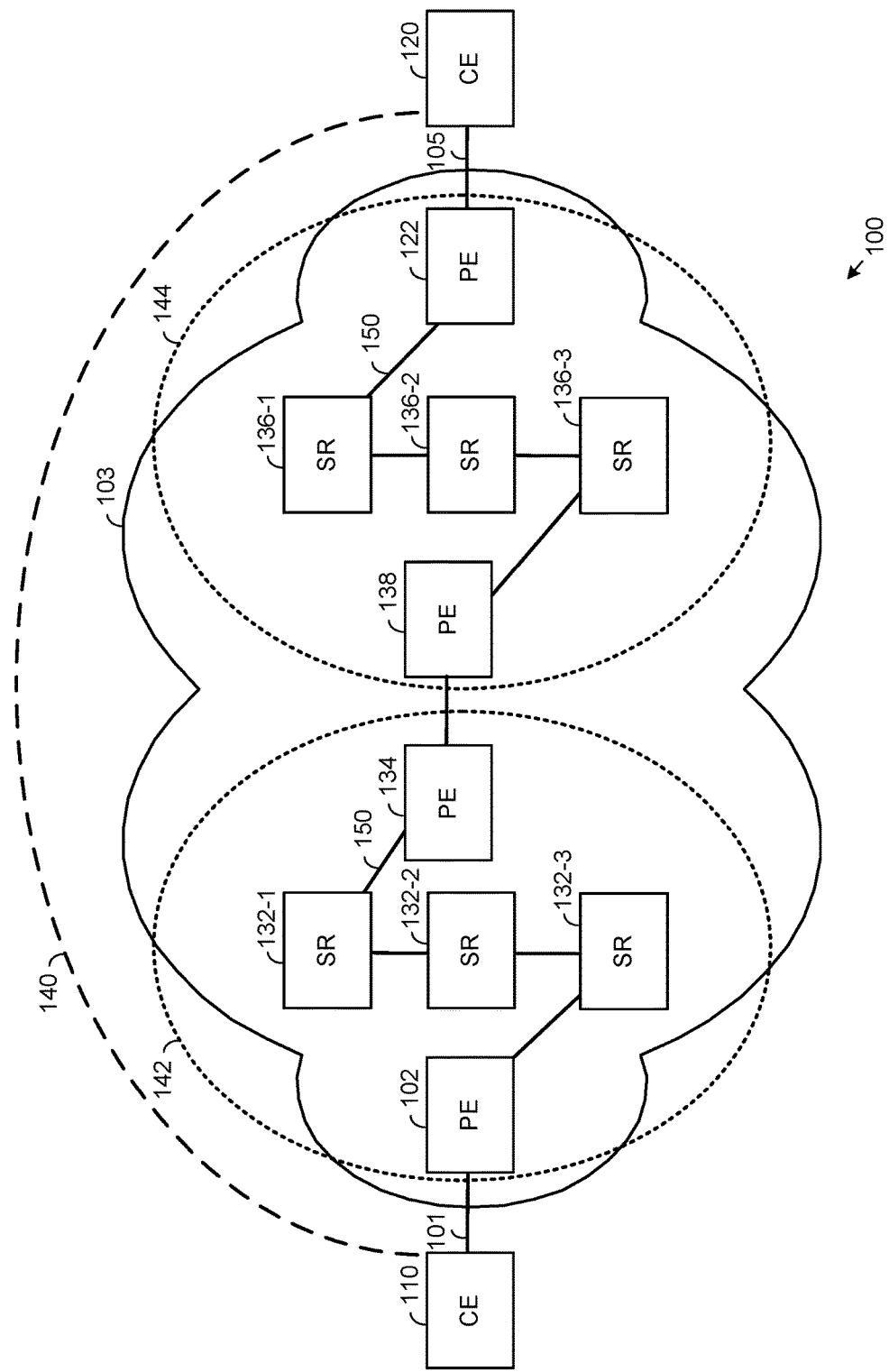
FIG. 1 is a system diagram illustrating the setup and servicing of a pseudowire connection in the context of a packet data network according to a described embodiment.

FIG. 1 is a system diagram illustrating the setup and servicing of a pseudowire connection in the context of a packet data network according to a described embodiment. The system 100 of FIG. 1 is suitable for implementing a pseudowire connection between Customer Equipment (CE) routers 110 and 120 via a Packet Data Network (PDN, a/k/a packet switched network) 103 using one or more embodiments of the present disclosure. The PDN 103 includes two Administrative Systems (ASs) 142 and 144. The terms Autonomous System and Administrative System are used interchangeably herein with the acronym AS applying equally to each.

Within the Internet, an AS is a collection of connected Internet Protocol (IP) routing prefixes under the control of one or more network operators on behalf of a single administrative entity or a domain that presents a common, clearly defined routing policy to the Internet. Originally the definition of an AS required control by a single entity, typically an Internet service provider or a very large organization with independent connections to multiple networks, that adhere to a single and clearly defined routing policy. With a newer definition multiple ASs may be supported by a single entity. Each AS must have an officially registered autonomous system number (ASN). A unique ASN is allocated to each AS for use in Border Gateway Protocol (BGP) routing with each ASN uniquely identifying a respective network of the Internet.

With the embodiment of FIG. 1, the first AS 142 includes Provider Equipment (PE) routers 102 and 134 and Switching Routers (SRs) 132-1, 132-2 and 132-3. The second AS 144 includes PE routers 122 and 138 and SRs 136-1, 136-2 and 136-3. the First AS 142 and the second AS 144 interconnect via PE routers 134 and 138, respectively. However, in other embodiments, the ASs 142 and 144 may interconnect via additional PE routers.

Pseudowire operations cause, from a customer's perspective, CE routers 110 and 120 to appear to be directly connected over a dedicated private circuit 140. However, in the example of FIG. 1, a message sent from CE router 110 to CE router 120 follows pathway 150, which extends across both AS 142 and AS 144. The pathway 150 runs through attachment circuit 101 to PE router 102 and then through the first AS 142 via SR 132-3, SR 132-2, and SR 132-1 to reach PE router 134. The pathway 150 then runs from PE router 134 to PE router 138 and then through the second AS 144 via SR 136-3, SR 136-2, and SR 136-1 to reach PE router 122 before reaching CE router 120 via attachment circuit 105. Note that the physical pathway for another message sent from CE router 110 to CE router 120 may include the same PE routers 134 and 138, different PE routers, the same SRs 132-N and SRs 136-N, or different PR routers and SRs in one or more different paths. Likewise, messages sent from CE router 120 to CE router 110 may take the same pathway 150 or one or more different paths.

However, support for pseudowire operations across differing ASs, i.e., AS 142 to AS 144 or vice versa is needed. Thus, in order to overcome this shortcoming of prior systems, among other shortcomings, structures and methods according to the present disclosure include extending inter AS operations to support the establishment and servicing of pseudowire across two or more ASs 142 and 144. These operations include the propagation of pseudowire data across one or more AS boundaries in BGP-LS messages.

Embodiments of the present disclosure may be applied to the Internet Engineering Task Force (IETF) extensions to the North-Bound Distribution of Link-State and Traffic Engineering (TE) Information using BGP published under Request for Comments (RFC) 7752 in March 2016 under ISSN: 2070-1721. Extensions of such protocol operations include the distribution of pseudowire data in both north-bound (IGP to BGP-LS) and south-bound (BGP-LS to IGP) directions. Examples of structures for the distribution of pseudowire data are described herein with reference to existing protocol standards. However, the teachings of the present disclosure may be applied in manners other than the examples disclosed herein.

Each packet traveling through the PDN 103 has a header and payload. The header contains address information used to route the packet through the PDN 103 and the payload is the actual information to be transmitted, for example user data and control data. When an SR (132-*n* or 136-*n*) receives a packet, it forwards the packet to another SR according to the header. In an Multiprotocol Label Switching (MPLS) PDN 103, labels identify virtual links (paths) between SRs, and the header of a packet traveling through a MPLS PDN 103 includes at least one label. When a packet arrives at an SR, the SR examines the label and forwards the packet to the next SR or PE according to the label.

The Segment Routing MPLS (SR-MPLS) data plane protocol is deployed within ASs 142 and 144. With the SR-MPLS, a stack of transport labels is transmitted/pushed by PE router 102 with an inner pseudowire service label (one embodiment of pseudowire data), which is exchanged with OSPF pseudowire extensions within an AS 142 or 144 and with the extensions presented herein between AS 142 and AS 144. This stack of transport labels of the SR-MPLS determines the path a data packet takes within AS 142 or AS 144 but not within both AS 142 and AS 144. Using inter-AS option A, B, C (RFC 4364) of the Interior Gateway Protocol (IGP), PE router 134 and PE router 138 exchange labels for establishing transport LSP for packets to reach PE router 122 of AS 144 via PE router 138.

In order for pseudowire operations to be supported across ASs 142 and 144, PE router 138 must know the inner pseudowire service label of PE router 102 for CE 110. This inner pseudowire service label (pseudowire data) is present in OSPF pseudowire extensions of IGP. According to embodiments described herein, the pseudowire data is provided from IGP to BGP-LS at PE router 134 (north-bound extensions) and provided to PE router 138 via BGP-LS. PE router 138 uses the pseudowire data received via BGP-LS from PE router 134 and provides the pseudowire data to IGP (OSPF/IS-IS) within PE router 138 for propagation of the pseudowire data within AS 144. The pseudowire data is then flooded through AS 144 via IGP and received by PE router 122. These same operations are performed in the reverse direction as well so that the pseudowire service label information of PE router 122 is provided to PE router 102. With embodiments described herein, operations support an inner pseudowire service label being provided from PE router 138 to PE router 134 via BGP-LS.

Figure 2A:
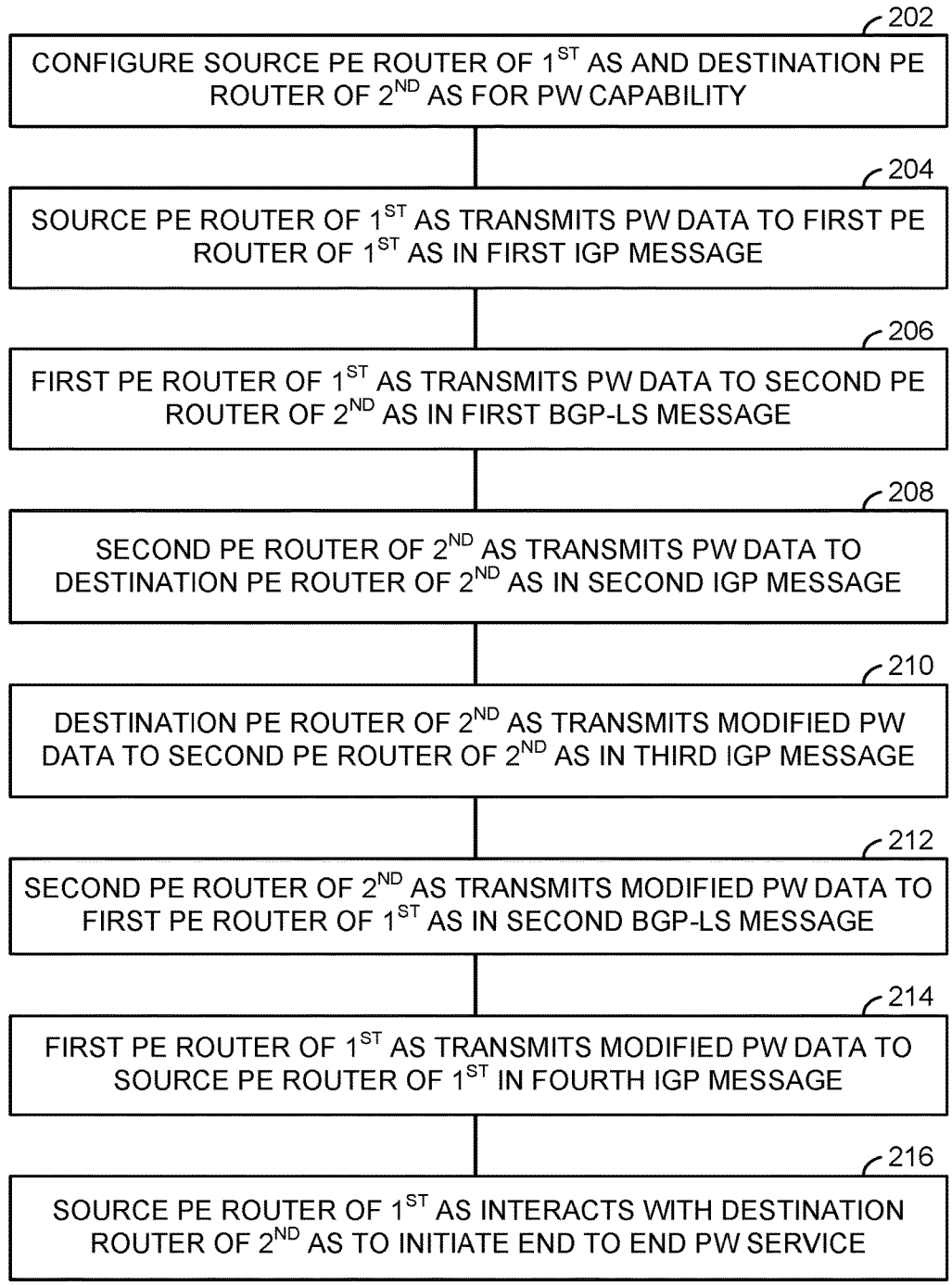
FIG. 2A is a flow chart illustrating operation of the system of FIG. 1 in servicing a pseudowire connection according to a described embodiment.

FIG. 2A is a flow chart illustrating operation of the system 100 of FIG. 1 in servicing a pseudowire connection according to a described embodiment. Operations 200 commence with a service provider operator configuring PE routers 102 and 122 to support pseudowire communications (step 202). The exact procedures for performing step 202 are manufacturer-specific. By way of example and not limitation, configuring may begin with the service provider operator receiving a request from a customer needing an ATM connection between CE routers 110 and 120. In response, the service provider may enter configuration information on PE routers 102 and 122, such as IP addresses of the remote PE routers 102 and 122, a pseudowire identifier (unique to the PE router), identification of the emulated service, a pseudowire label, and creation of routing instructions associating the pseudowire with CE routers 110 and 120. The pseudowire label is dependent on the emulated service. As defined by RFC 5036 § 3.4.2, ATM and Frame Relay links have specific label formats, while for some emulated services, the service provider operator may manually define a static pseudowire label, and for other emulated services, software on the PE router will allocate a pseudowire label dynamically.

Prior systems set up a pseudowire within a single AS using IGP. Operations described with reference to the present disclosure extend these concepts for application across multiple ASs 142 and 144. In short, PE router 102, also referred to herein as the "source PE router" creates an Extended Prefix LSA with a Pseudowire Association TLV. The Pseudowire Association TLV has the source IP address of PE router 102 and the destination IP address of PE router 122, also referred to herein as the "destination PE router". The Pseudowire Association TLV also has a Pseudowire Sub-TLV which includes a Pseudowire Type (in this case, indicating ATM emulation service), the assigned pseudowire ID, a pseudowire Status of 0, an S bit set to 0, and a label associated with the emulated service (in this case, an ATM label). All types of pseudowire data communicated within the system 100 of FIG. 1 is referred to as "pseudowire data." PE router 102 then floods the AS 142 with the Extended Prefix LSA that includes the pseudowire data in a first IGP message to inform the other routers (including PE Router 134) that PE router 102 wants to establish a pseudowire with PE router 122 (step 204).

According to the operations 200 of FIG. 2A, PE router 134 receives the first IGP message sent by source PE router 102 that includes the pseudowire data. PE router 134, located within AS 142, recognizes from the pseudowire ID, pseudowire Type, source IP, and destination IP of the pseudowire data, that the destination PE router 122 is in a second AS 144. In response, PE router 134 passes the pseudowire data from IGP to BGP-LS (north-bound distribution), creates a first BGP-LS message that includes the pseudowire data, and transmits the first BGP-LS message to a second PE router 138 of the second AS 144 (step 206). The manner in which the pseudowire data is formatted and carried will be described further herein with reference to FIGS. 3A-5. Differing techniques for BGP-LS messaging between PE router 134 of first AS 142 and PE router 138 of second AS 144 will be described with reference to FIGS. 6-8.

The second PE router 138 of the second AS 144 receives the first BGP-LS message and passes the pseudowire data to IGP (south-bound distribution of pseudowire data). The second PE router 138 then creates a second IGP message that includes the pseudowire data and transmits the second IGP message to the destination PE router 122 of the second AS 144 (step 208). The destination PE router 122 of the second AS 144 receives the second IGP message that includes the pseudowire data and extracts the pseudowire data. Based upon the content of the pseudowire data, the destination PE router 122 determines that the second PE router 138 is not the source PE router 102. This determination may be made by either determining that a status bit of the pseudowire data is set accordingly or by comparing the IP address of the second PE router 138 to the IP address of the source PE router 102 that is included with the pseudowire data. After making this determination, the destination PE router 122 modifies the pseudowire data to create modified pseudowire data. The destination PE router 122 then creates a third IGP message that includes the modified pseudowire data and transmits the third IGP message to the second PE router 138 (step 210).

The second PE router 138 of the second AS 144 receives the third IGP message from the destination PE router 122, distributes the modified pseudowire data to BGP-LS, creates a second BGP-LS message that includes the modified pseudowire data, and transmits the second BGP-LS message to the first PE router 134 of the first AS 142 (step 212). The first PE router 134 of the first AS receives the second BGP-LS message, distributes the modified pseudowire data from BGP-LS to IGP (south-bound distribution), creates fourth IGP message that includes the modified pseudowire data, and transmits the fourth IGP message to the source PE router 102 of the first AS 142 (step 214). The source PE router 102 of the first AS 142 receives the fourth IGP message and, based upon the contents thereof, interacts with the destination PE router 122 of the second AS 144 to initiate end-to-end pseudowire service (step 216).

Figure 2B:
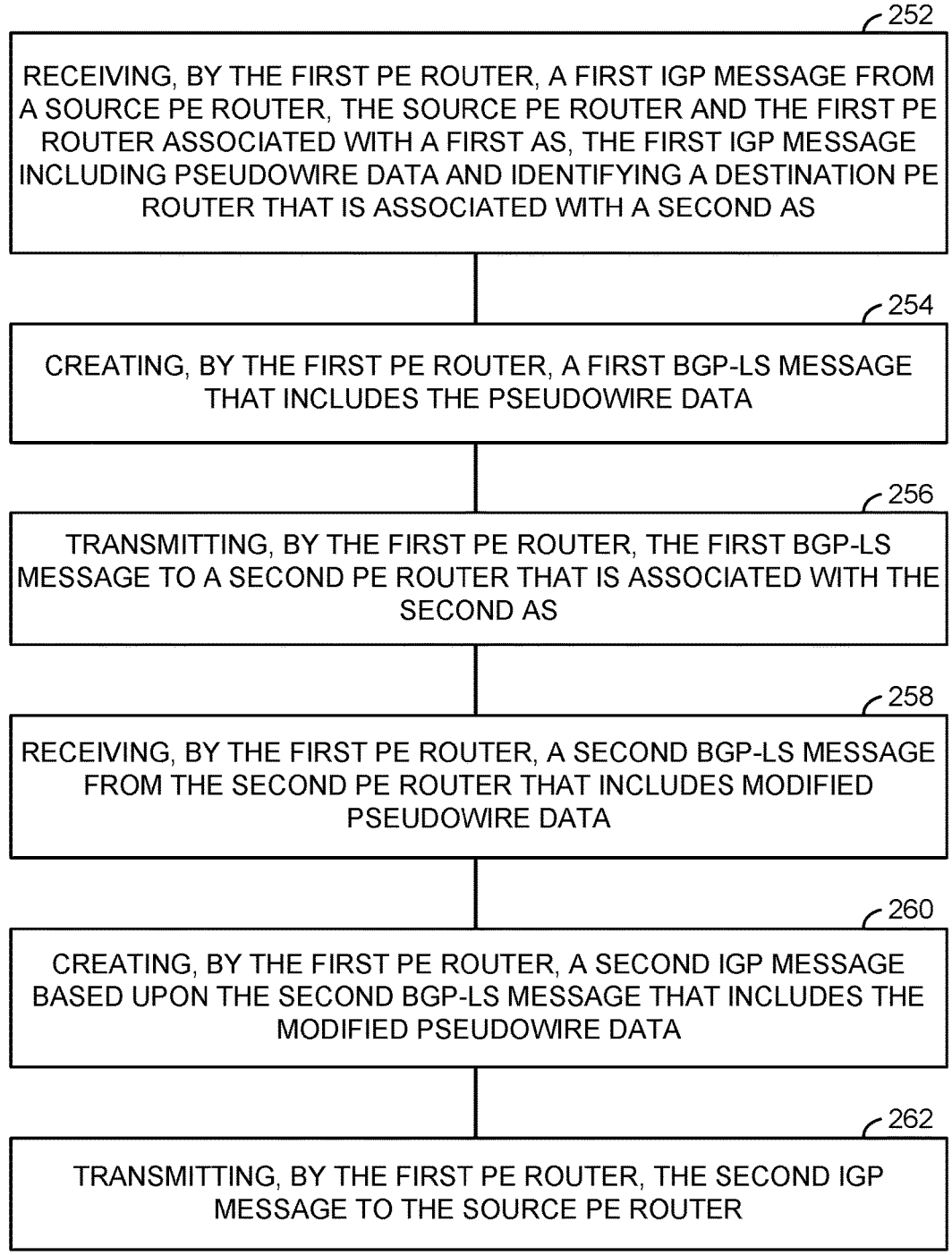
FIG. 2B is a flow chart illustrating operation of a PE router of the system of FIG. 1 in servicing a pseudowire connection to a described embodiment.

FIG. 2B is a flow chart illustrating operation of a first PE router of the system of FIG. 1 in servicing a pseudowire connection to a described embodiment. Operations 250 commence with the receiving, by the first PE router 134, a first IGP message from a source PE router 102, the source PE router 102 and the first PE router 134 associated with a first AS 142, the first IGP message including pseudowire data and identifying a destination PE router 122 that is associated with a second AS 144 (step 252). Operations 250 continue with creating, by the first PE router 134, a first BGP-LS message that includes the pseudowire data (step 254) and transmitting, by the first PE router 134, the first BGP-LS message to a second PE router 138 that is associated with the second AS 144 (step 256). Operations 250 continue with receiving, by the first PE router 134, a second BGP-LS message from the second PE router 138 that includes modified pseudowire data (step 258) and then creating, by the first PE router 134, a second IGP message based upon the second BGP-LS message that includes the modified pseudowire data (step 160). Operations 150 conclude with transmitting, by the first PE router 134, the second IGP message to the source PE router 102 (step 262).

The operations 250 of FIG. 2B include various aspects that may be applied singularly or in combination. According to one aspect, the modified pseudowire data is the pseudowire data as modified by the destination PE router. According to another aspect, the first BGP-LS message carries Network Layer Reachability Information (NLRI) that includes the pseudowire data. According to still another aspect, the second BGP-LS message carries NLRI that includes the modified pseudowire data. According to yet another aspect, the first PE router transmits the first BGP-LS message to the second PE router using External Border Gateway Protocol (eBGP) peering and the first PE router receives the second BGP-LS message from the second PE router using eBGP peering. According to still another aspect, the first PE router transmits the first BGP-LS message to the second PE router via a first BGP Route Reflector (RR) of the first AS and a second BGP RR of the second AS and the first PE router receives the second BGP-LS message from the second PE router via the second BGP RR of the second AS and the first BGP RR of the first AS.

Figure 2C:
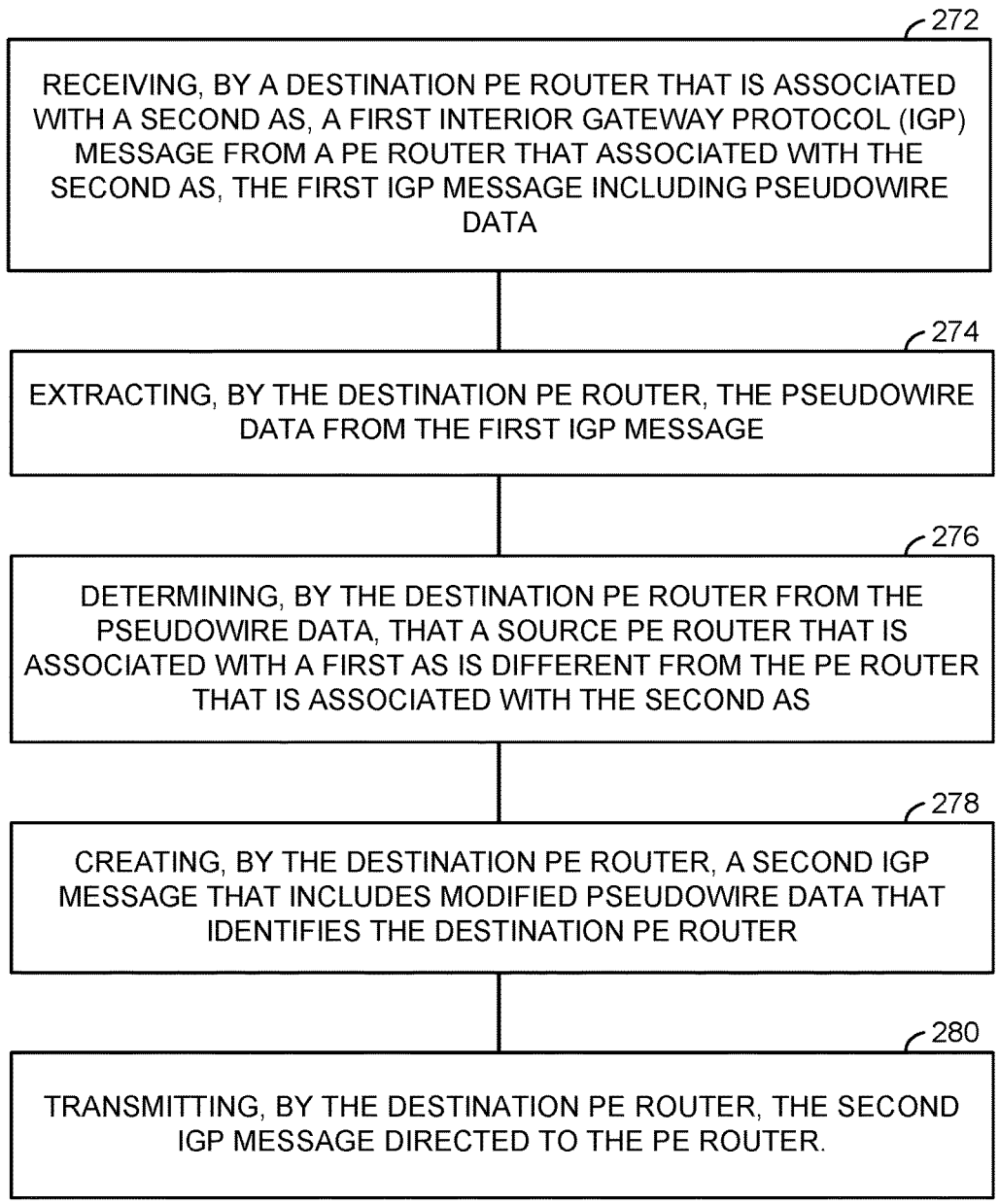
FIG. 2C is a flow chart illustrating operation of a destination PE router of the system of FIG. 1 in servicing a pseudowire connection to a described embodiment.

FIG. 2C is a flow chart illustrating operation of a destination PE router, e.g., PE router 122, of the system of FIG. 1 in servicing a pseudowire connection to a described embodiment. Operations 270 begin with the destination PE router 122, that is associated with a second AS 144, receiving a first IGP message from a PE router 138 that is associated with the second AS 144 (step 272). The, first IGP message includes pseudowire data (that originated with source PE router 102 and traversed path 150). Operations 270 continue with extracting, by the destination PE router 122, the pseudowire data from the first IGP message (step 274). Operations 270 continue with determining, by the destination PE router 122 from the pseudowire data, that the source PE router 102, that is associated with a first AS 142, is different from the PE router 138 that is associated with the second AS 144 (step 274). Operations 270 continue with creating, by the destination PE router 122, a second IGP message that includes modified pseudowire data that identifies the destination PE router 122 (step 276). Operations 270 conclude with transmitting, by the destination PE router 122, the second IGP message directed to the PE router 138 (step 278).

The operations 270 of FIG. 2C include various aspects that may be applied singularly or in combination. According to one aspect, in determining, by the destination PE router 122 from the pseudowire data, that the source PE router 102 is different from the PE router 138, the destination PE router extracts a status bit from the pseudowire data and determines, from the status bit that the source PE router 102 is different from the PE router 138. According to another aspect, the destination PE router 122 determines from the pseudowire data that the source PE router 102 is different from the PE router 138 by extracting an IP address of the source PE router 102 from the pseudowire data and comparing the IP address of the source PE router 102 to the IP address of the PE router 134.

The following paragraphs define data structures that carry pseudowire data according to one or more embodiments of the present disclosure. As one of ordinary skill will understand, the exact format and content of any given data structure, e.g., TLV or sub-TLV, is subject to industry review and agreement, and as such, the TLVs and sub-TLVs described here are examples only. The embodiments of the present disclosure may be implemented with variation(s) on the TLVs and sub-TLVs described here without departing from the spirit of the present disclosure. Further, as one of ordinary skill will understand, type and sub-type fields are assigned by the Internet Assigned Numbers Authority (IANA), and as such, for the purposes of this disclosure, the type and sub-type fields in the following TLVs and sub-TLVs are listed simply as "to-be-determined" ("TBD"). Finally, as one of ordinary skill will understand, there are currently two versions of OSPF, version 2 (OSPFv2), which is defined by Request for Comments (RFC) 2328 and version 3 (OSPFv3), which is defined by RFC 5340. Should a new version of OSPF be developed, the versions of the TLVs and sub-TLVs described here could be modified without departing from the spirit of the disclosure.

Generally, the fields of the TLVs described with reference to FIGS. 3A-5 have corresponding TLVs described in respective IGP documents. Differences between the IGP TLV implementation and the BGP-LS TLVs of the present disclosure are described herein. Generally, the data structures of FIGS. 3A-5 carry IGP pseudowire TLVs into BGP-LS (Network Layer Reachability Information) NLRIs with some differences.

IS-IS is a link-state IGP. Like OSPF, IS-IS runs the Dijkstra shortest-path first (SPF) algorithm to create a database of the network's topology and, from that database, to determine the best (that is, shortest) path to a destination. IS-IS uses a slightly different terminology than OSPF for naming its protocol packets. The packets that IS-IS routers send to each other describing the network topology are called link-state protocol data units (link-state PDUs, or LSPs). In addition to describing the network topology that the router knows about, the link-state PDUs include IP routes, checksums, and other information. The data structures described herein apply to both the OSPF and IS-IS protocols. In particular, the data structures set forth herein relate to BGP-LS messaging across ASs, e.g., AS 142 to AS 144 or AS 144 to AS 142.

FIG. 3A is a block diagram illustrating a format for a Pseudowire Capability TLV according to a described embodiment. With this Pseudowire Capability TLV 310, the Type Field has a length of 2 Bytes and identifies the BGP-LS NLRI attribute Registry. The Length field has a length of 2 Bytes and indicates the Total Length of the Capabilities in bytes. There must be at least one Capability Parameters sub-TLVs. Each Capability Parameters sub-TLV includes a sequence of: (1) 1 octet of Capability type (new registry for the capabilities); (2) 1 octet of length of the value field of the Capability; and (3) 0-243 octets of the value of the Capability (if any).

FIG. 3B is a block diagram illustrating a format for a Pseudowire Capability Sub-TLV according to a described embodiment. With this Pseudowire Capability Sub-TLV 320, the Type Field has a length of 2 Bytes and identifies a new sub-registry of the BGP-LS Node Network NLRI attribute Registry described with reference to FIG. 3A. The Length field has a length of 2 Bytes, has no value field, and indicates that an originating PE router (e.g., source PE router 102 or destination PE router 122) has the capability to support pseudowire.

FIG. 3C is a block diagram illustrating a format for an IPv4 Pseudowire Association TLV according to a described embodiment. With the IPv4 Pseudowire association TLV 330, the structure of the Type field is TBD to identify a BGP-LS Node NLRI attribute Registry. The Length field indicates a length of the value portion of the IPv4 Pseudowire association TLV 330 (variable). The AF field is set to 0 to indicate a IPv4 unicast. The MT-ID field is the multi topology identifier (as defined in [RFC4915]). The Flags field is 8 bits; Reserved bits of FLAGS must be sent as 0 and be ignored on receipt. The R-Flag filed is a Re-advertisement Flag (Bit 0) and is set when this TLV has been leaked from one level to another (upwards or downwards). If R-Flag is set then the TLV must not be leaked further. The reserved field is 3 Bytes reserved field must be reset on transmission and ignored on reception.

The Source IPv4 IP address of the pseudowire Association originator in the Network Build Out (NBO) is 4 bytes. This is generally the loopback interface IPv4 IP address of the originating PE router, e.g., source PE router 102. The Destination IPv4 IP address of the pseudowire Association destination in the NBO is 4 bytes. This is generally the loopback interface IPv4 IP address of the destination PE router, e.g., destination PE router 122. Each sub-TLV (one or more) consists of a sequence of 2 octets of sub-TLV type (new registry for this TLV) and 2 octets of the length of the value field of the sub-TLV. The TLV 330 must have at least one sub-TLV associated when sent in LSA or else this TLV must be ignored on receipt. This TLV 330 may appear any number of times (including none) within an BGP-LS message. A new Sub-TLV registry for BGP-LS Node NLRI (IANA) is created for all sub-TLV(s) in this TLV 330.

FIG. 3D is a block diagram illustrating a format for an IPv6 Pseudowire association TLV according to a described embodiment. With the IPv6 Pseudowire association TLV 340, the structure of the Type field is TBD to identify a BGP-LS Node NLRI attribute Registry. The Length field indicates a length of the value portion of the IPv6 Pseudowire association TLV 340 (variable). The AF field is set to 0 to indicate a IPv6 unicast. The FLAGS field is 8 bits; Reserved bits of FLAGS must be sent as 0 and be ignored on receipt. The R-Flag filed is a Re-advertisement Flag (Bit 0) and is set when this TLV has been leaked from one level to another (upwards or downwards). If R-Flag is set then the TLV must not be leaked further. The reserved field is 3 Bytes reserved field must be reset on transmission and ignored on reception.

The Source IPv6 IP address of the pseudowire Association originator in the Network Build Out (NBO) is 16 bytes. This is generally the loopback interface IPv6 IP address of the originating PE router, e.g., source PE router 102. The Destination IPv6 IP address of the pseudowire Association destination in the NBO is 16 bytes. This is generally the loopback interface IP address of the destination PE router, e.g., destination PE router 122. Each sub-TLV (one or more) consists of a sequence of 2 octets of sub-TLV type (new registry for this TLV) and 2 octets of the length of the value field of the sub-TLV. The TLV 340 must have at least one sub-TLV associated when sent in LSA or else this TLV must be ignored on receipt. This TLV 340 may appear any number of times (including none) within an BGP-LS message. A new Sub-TLV registry for BGP-LS Node NLRI (IANA) is created for all sub-TLV(s) in this TLV 340.

Referring to both FIGS. 3C and 3D, note that the IPv4 'R' flag must be set for IPv4 pseudowire association TLV 330 and IPv6 pseudowire association TLV 340 to differentiate a node's (PE router's) native pseudowires and inter-area or inter-AS pseudowires.

FIG. 4A is a block diagram illustrating a pseudowire Sub-TLV according to a described embodiment. Most of the fields of the pseudowire Sub-TLV 402 are consistent with those of the IGP pseudowire Sub-TLV. Differences are that the Type field which defines a new sub type (IANA TBD) BGP-LS Node NLRI attribute pseudowire Association TLV Sub-Registry and the Length field that indicates a Length of this pseudowire Sub-TLV 402. Additional fields include pseudowire type, pseudowire status, pseudowire ID, Label TLV and one or more interface parameter sub-TLV in octets. If the Length field value is 4, then it references all pseudowires using the specified group ID, and there is no pseudowire ID present (nor are there any interface parameter sub-TLVs.) Based upon the Sub-TLV 402, a new sub-TLV registry is created for BGP-LS Node NLRI (IANA) is created for all sub-TLVs of the corresponding TLV.

FIG. 4B is a block diagram illustrating a Pseudowire Group ID Sub-TLV according to a described embodiment. The Pseudowire Group ID Sub-TLV 404 includes a Type field that identifies the Pseudowire Group ID Sub-TLV 404 to be a new sub-sub type (IANA TBD) BGP-LS NLRI attribute pseudowire sub-TLV Registry. The Length field is 4 octets. The Group ID field corresponds to the field having the same name in the IGP.

FIG. 4C is a block diagram illustrating a Pseudowire Extended Status Sub-TLV according to a described embodiment. The Pseudowire Extended Status Sub-TLV 406 includes a Type field that identifies the Pseudowire Extended Status Sub-TLV 406 to be a new sub-sub type (IANA TBD) BGP-LS NLRI attribute pseudowire sub-TLV Registry. The Length field is fixed at 16 octets. The Status Code fields include a plurality of bits, each of which indicates a different status value.

FIG. 5 is a block diagram illustrating a Pseudowire Parameters Sub-TLV according to a described embodiment. The Pseudowire Parameters Sub-TLV 502 includes a Type filed that corresponds to a new sub-sub type (IANA TBD) BGP-LS Node NLRI attribute pseudowire sub-TLV Registry. The Length field specifies the Value portion of the Pseudowire Parameters Sub-TLV 502 in bytes.

Referring to all of FIGS. 1-5, various aspects of embodiments of the present disclosure are discussed in an operational context. A Link State Data Base (LSDB) is a database of all OSPF router LSAs, summary LSAs, and external route LSAs. The LSDB is compiled by an ongoing exchange of LSAs between neighboring routers (PE routers and switches) that each router is synchronized with its neighbor. When the AS 142 or 144 has converged, all routers have the appropriate entries in their LSDB. For BGP-LS north-bound distribution of pseudowire data, as defined in RFC 7752, all LSDB content is distributed from IGP to BGP-LS. According to the present disclosure, node NLRI attributes are extended with pseudowire data and there is no differential treatment needed for this information from existing Node NLRIs. The reason for creating new registries using BGP-LS NLRIs is to enable encoding from OSPF to BGP-LS or IS-IS to BGP-LS. For example, AS 142 might use OSPF as IGP and 144 might use IS-IS as IGP. Thus, by transferring pseudowire data between AS 142 and AS 144 as described herein, both OSPF and IS-IS is supported.

For south-bound redistribution of pseudowire data from BGP-LS to IGP, a number of alterations to existing standards is required. A new configuration is enabled with possible granularity of what NLRI types need to be redistributed back to IGP from the BGP-LS. Further, it is possible to have different operations in south-bound redistribution as compared to north-bound distribution as described herein. According to the present disclosure, TLVs/Sub-TLVs of Node NLRI Attributes are redistributed back to IGP from BGP-LS. These include, in various operations/embodiment, pseudowire Capabilities TLV & Sub-TLVs, IPv4 pseudowire association TLV, IPv6 pseudowire association TLV, pseudowire Sub-TLV, Group ID Sub-Sub-TLV, pseudowire Extended Status sub-sub-TLV, and pseudowire Interface Parameters sub-sub-TLV as described above. Based on the destination IGP these TLVs are part of corresponding LSAs (OSPF/OSPFv3) or LSPs (IS-IS) in the respective IETF drafts.

When considering inter AS operations, based on PE router local leaking policy, the TLVs (pseudowire association) should be propagated to another OSPF level and must preserve the R-Flag (as these are already set during south-bound redistribution). There is no change in the remainder of the rules for processing the TLVs when the R-Flag is set at the destination PE. For reachability of the destination IP in PWA (or the Source IP of the leaked PWA TLV of the remote node), longest prefix match (LPM) should be sufficient.

When considering pseudowire association TLV operations, the pseudowire label bindings are distributed using OSPF/IS-IS PW Association TLVs 330 and 340 defined above (IPv4/IPv6). The PE routers will establish an IGP pseudowire association using the pseudowire Association TLVs 330 and 340. The originating PE router 102 uses one of its own reachable loopback address as a Simple IP (SIP) address and specified destination PE router's, e.g., PE router 122, loopback as a Dynamic IP (DIP) address. An OSPF router capability TLV indicates one or more capabilities with pseudowire capability sub-TLVs as locally configured. The IP address of the destination PE router 122 only has to be reachable but need not be a loopback address of a node advertising as such IP address would be distributed using BGP-LS. The Sub-TLVs are used to indicate the meaning of the label. In the current context, a Sub-TLV is used to identify a particular pseudo wire to which a particular label is bound. According to the present disclosure, two new Sub-TLVs, Pseudowire Sub-TLV and Generalized Pseudowire Sub-TLV, are used for identifying pseudowires.

During pseudowire setup procedures, if a pseudowire originator (e.g., PE router 102) receives a pseudowire Association TLV that has a destination IP address that matches the originator IP address (and Multi-Topology ID (MTID) matches the originator MTID in case of OSPFv2), the pseudowire originator compares the capabilities exchanged in the Router Capability TLV. The pseudowire originator looks into Sub-TLVs based on capabilities that both the pseudowire originator (e.g., PE router 102) and pseudowire remote (e.g., PE router 122) mutually agree on. If the pseudowire capability (FEC 128 capability) is supported by both the pseudowire originator and the pseudowire remote, then Pseudowire Sub-TLVs (FEC 128) are examined by the pseudowire originator. If the pseudowire originator has the same pseudowire ID pseudowire Type locally configured and has advertised the Pseudowire Sub-TLV towards the pseudowire remote, from where the Pseudowire Association TLV is received, the two-way bit (S bit) is set in the LSA and re-advertised. However, the source and destination nodes where the pseudowire originated may be in different ASs and the loopback address of the node advertising (source/destination) may not match the advertising node LSA (OSPF)/LSP(ISIS). In this case R-Bit must be set.

One of ordinary skill in the art will recognize a number of variations in the foregoing embodiment. For example, in some of the foregoing embodiments, the operations are described for OSPFv2 LSAs, however one of ordinary skill would understand that in an OSPFv3 network, the PE routers would use the OSPFv3 LSAs described earlier in this disclosure. Further, in the described embodiments, PE router 102 was characterized as originating the exchange of LSAs, however, one of ordinary skill would understand that either PE router 102 or 122 could be characterized as the originator. Further, both PE routers 102 and 122 could be sending out originating LSAs; this may alter the ordering of messages, but ultimately both PE routers 102 and 122 will receive a Pseudowire Sub-TLV with the S bit set and pseudowire will be ready for data transfer. Further, the format of the TLVs and Sub-TLVs can be varied to include additional information and/or omit other information, and the TLVs and Sub-TLVs could be associated with other OSPF LSAs than those listed in this disclosure. These variations are included here as examples and not limitations of the scope of the present disclosure.

In embodiments of the present disclosure, an active pseudowire becomes inactive by withdrawing the pseudowire label. There are several variations on how this could occur. In one variation, a PE router sends a Router Information Opaque LSA (OSPFv2) or Router Information LSA (OSPFv3) without the Pseudowire Capability TLV advertising pseudowire capabilities. In another variation, a PE router sends a Pseudowire Association TLV with a non-zero value for the status. In another variation, a PE router sends a Pseudowire Association TLV without a Pseudowire Sub-TLV. Note that after a label has been withdrawn by the output PE router and/or released by the input PE router, care should be taken not to advertise (re-use) the same released label until the output router can be reasonably certain that old packets containing the released label no longer persist in the MPLS-enabled network.

In other embodiments of the present disclosure, an operating pseudowire may become temporarily unavailable because of disruption in the PDN 103 or a disconnect of PE router 102 or 122 (because of equipment failure, device restart, in-service software upgrade, or other disruption). In such a case, a PE router 102 or 122 may not be aware of the disruption to the pseudowire until it receives, for example, an LSA associated with pseudowire initialization. However, unlike conventional pseudowires configurations, no special resynchronization protocols are needed to restore the pseudowire.

In some embodiments of the present disclosure, both ends of a pseudowire (for example, both PE routers 102 and 122) may be simultaneously attempting to establish the pseudowire. In such a case, LSAs may cross paths with the value of the S bit of the Pseudowire Sub-TLV of each LSA indicating the progress of the establishment of the pseudowire. By way of example, if the S bit of a Pseudowire Sub-TLV from a local PE router and the S bit of a Pseudowire Sub-TLV from a remote PE router are both 0, then neither PE router can send or receive data packets on the pseudowire. If the S bit of a Pseudowire Sub-TLV from the local PE router is 1 and the S bit of a Pseudowire Sub-TLV from a remote PE router is 0, this may indicate that the local PE router is ready to receive and has installed a pseudowire label in its Label Forwarding Information Base (LFIB), but it is still waiting for the remote PE router to indicate it is ready to receive. If the S bit of a Pseudowire Sub-TLV from the local PE router is 0 and the S bit of a Pseudowire Sub-TLV from a remote PE router is 1, this may indicate the reverse, namely that the remote PE router is ready to receive and has installed a pseudowire label in its LFIB, but it is still waiting for the local PE router to indicate it is ready to receive. Finally, if the S bit of a Pseudowire Sub-TLV from the local PE router and the S bit of a Pseudowire Sub-TLV from a remote PE router are both 1, then both ends are ready to receive and transmit.

Figure 6:
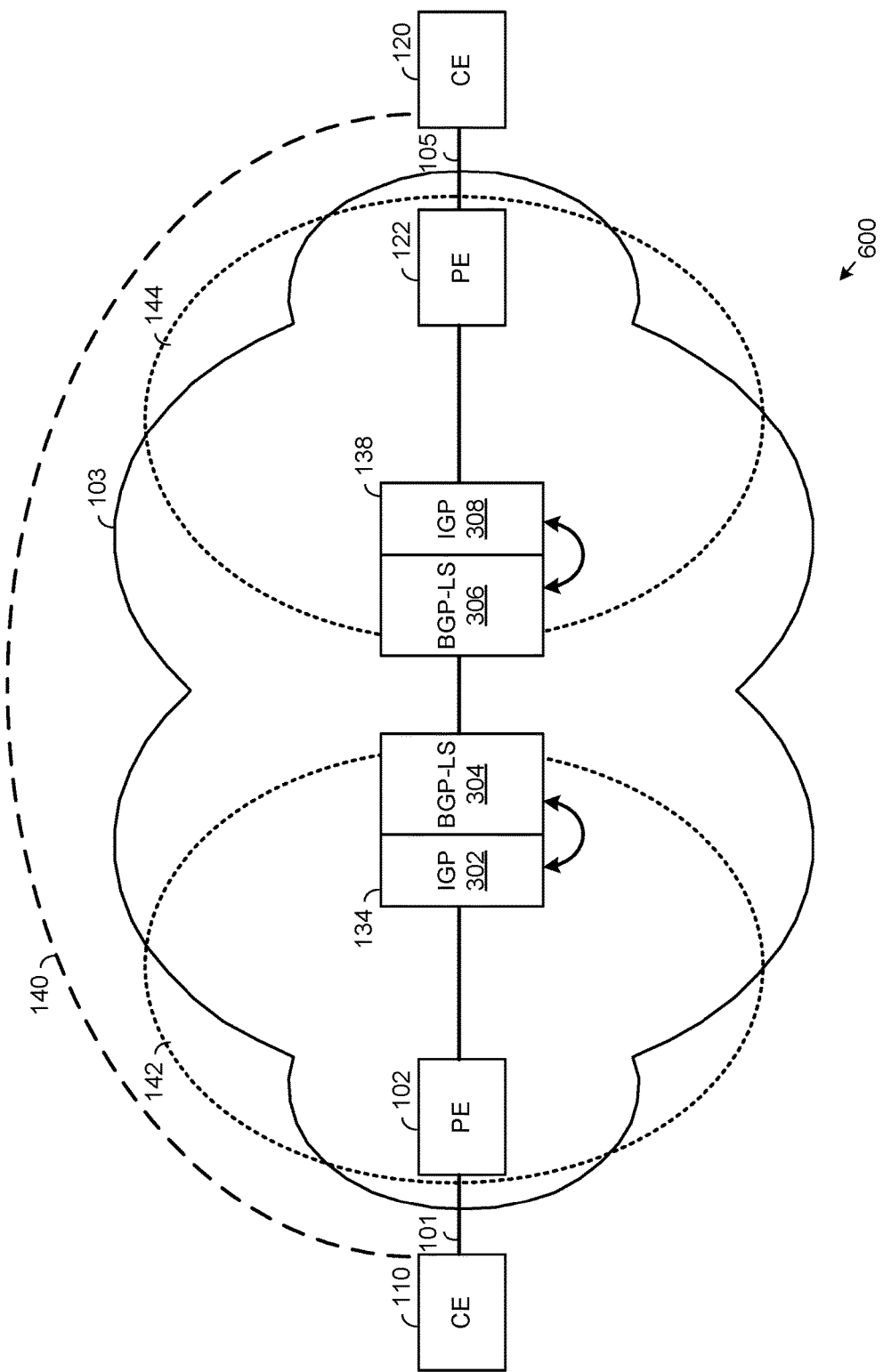
FIG. 6 is a system diagram illustrating the setup and servicing of a pseudowire connection in the context of a packet data network using external BGP (eBGP) edge peering according to a described embodiment.

FIG. 6 is a system diagram illustrating the setup and servicing of a pseudowire connection in the context of a packet data network using edge peering serviced by Provider Equipment (PE) of bordering ASs according to a described embodiment. The system 600 of FIG. 6 shares numbering with FIG. 1 for common elements. With FIG. 6, PE router 134 of AS 142 and PE router 138 of AS 144 support edge BGP (eBGP) peering with BGP-LS AFI/SAFI (RFC 7752). With this embodiment, PE router 134 and PE router 138 each support both IGP and BGP-LS. In particular, PE router 134 supports IGP 302 and BGP-LS 304. Likewise, PE router 138 supports BGP-LS 306 and IGP 308. For south-bound bridging of pseudowire data, IGP pseudowire TLVs are passed into BGP-LS NLRIs, which are transmitted from PE router 134 to PE router 138. This is no different than north-bound distribution of LS information as specified in RFC 7752 as modified according to the present disclosure.

However, pseudowire LS NLRI information has to be passed from PE router 138 to PE router 134. Thus, the present disclosure specifies a generic format for all LS NLRI information but also specifically for pseudowire information in LS NLRIs. IGP pseudowire TLVs are passed to BGP-LS NLRIs, a BGP-LS message is created that includes the NLRIs, and the BGP-LS message is transmitted from PE router 138 to PE router 134. The PE router 134 then passes the NLRIs to pseudowire TLVs, creates an IGP message that includes the pseudowire TLVs, and transmits the IGP message to source PE router 102. With these operations, pseudowire TLVs from PE router 102 are available at PE router 122 and vice-versa for end-to-end pseudowire operation.

Figure 7:
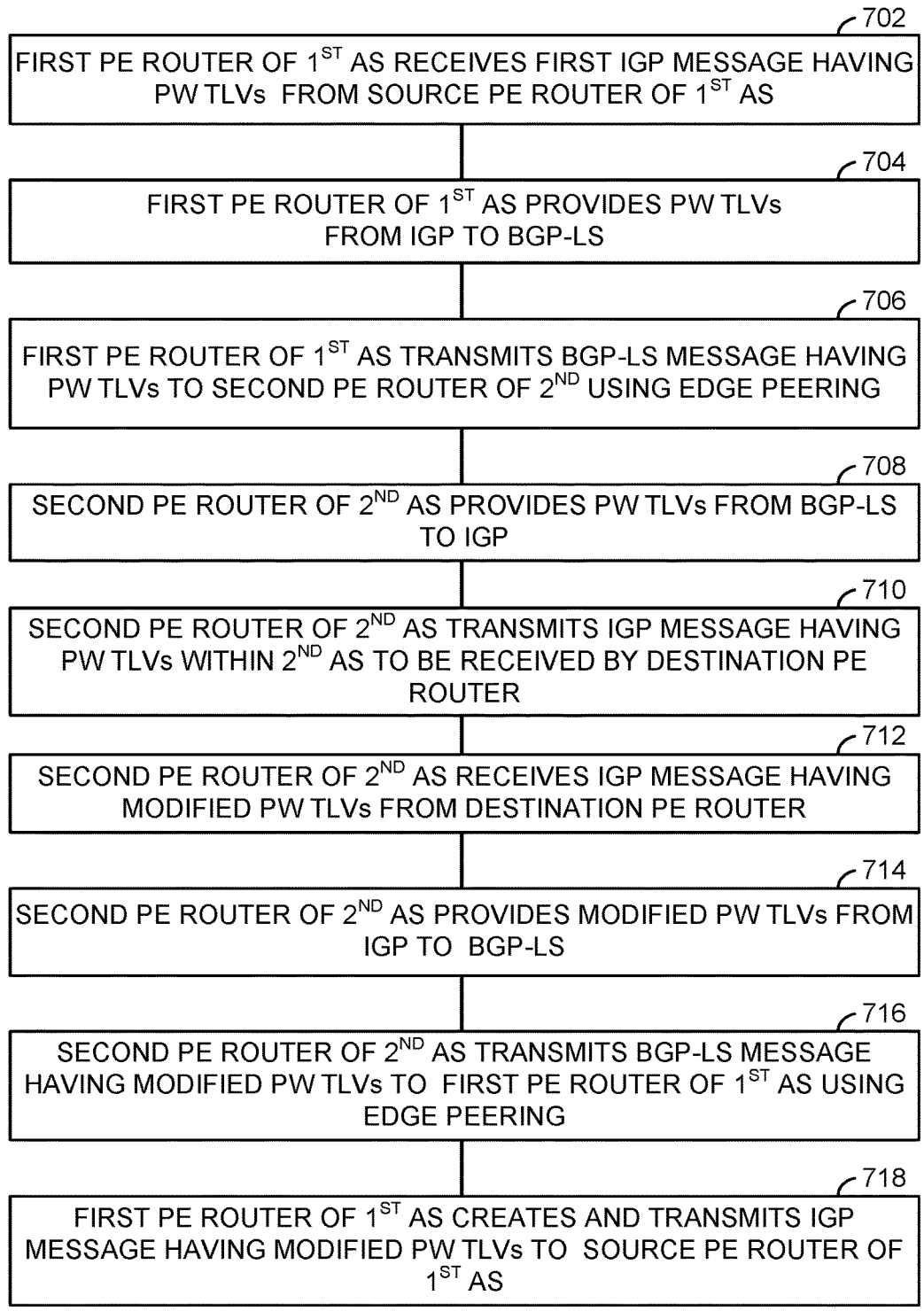
FIG. 7 is a flow chart illustrating operation of the system of FIG. 6 in servicing a pseudowire connection using eBGP edge peering according to a described embodiment.

FIG. 7 is a flow chart illustrating operation of the system of FIG. 6 in servicing a pseudowire connection according to a described embodiment. According to the operations 700 of FIG. 7, first PE router 134 of the first AS 142 receives a first IGP message (e.g., Extended Prefix LSA) sent by source PE router 102 of the first AS 142 that includes the pseudowire data in one or more pseudowire TLVs (step 702). The first PE router 134 recognizes from the contents of the pseudowire TLVs, e.g., pseudowire ID, pseudowire Type, source IP, and destination IP, that the destination PE router 122 is in a second AS 144. In response to this recognition, the PE router 134 provides the pseudowire TLVs from IGP to BGP-LS in a north-bound distribution operation (step 704). Next, the first PE router 134 transmits a BGP-LS message having the pseudowire TLVs to a second PE router 138 of the second AS 144 using eBGP edge peering (step 706).

The second PE router 138 of the second AS 144 receives the BGP-LS message and provides the pseudowire TLVs from BGP-LS to IGP in a south-bound redistribution operation (step 708). The second router 138 then creates and transmits an IGP message having the pseudowire TLVs within the second AS 144 so that it reaches the destination PE router 122 of the second AS 144 (step 710). The destination PE router 122 of the second AS 144 receives the IGP message that includes the pseudowire TLVs. Based upon the pseudowire TLVs, the destination PE router 122 determines that the second PE router 138 is not the source PE router 102. This determination may be made by determining that a status bit of the pseudowire data is set accordingly and/or by comparing the IP address of the second PE router 138 to the IP address of the source PE router 102 that is included with the pseudowire TLVs.

After making this determination, the destination PE router 122 modifies the pseudowire TLVs and creates and transmits an IGP message that includes the modified pseudowire TLVs for receipt by the second PE router 138 receives (step 712). The second PE router 138 of the second AS 144 provides the modified pseudowire TLVs from IGP to BGP-LS (step 714). The second PE router 138 of the second AS 144 then transmits a BGP-LS message having the modified pseudowire TLVs to the first PE router 134 of the first AS 142 using eBGP edge peering (step 716). The first PE router 132 of the first AS 142 extracts the pseudowire TLVs from the BGP-LS message, passes the modified pseudowire TLVs from BGP-LS to IGP, creates an IGP message that includes the modified pseudowire TLVs, and transmits the IGP message to the source PE router 102 of the first AS 142 (step 718). The source PE router 102 of the first AS 142 receives the IGP message and, based upon the contents thereof, interacts with the destination PE router 122 of the second AS 144 to initiate end-to-end pseudowire service.

Figure 8:
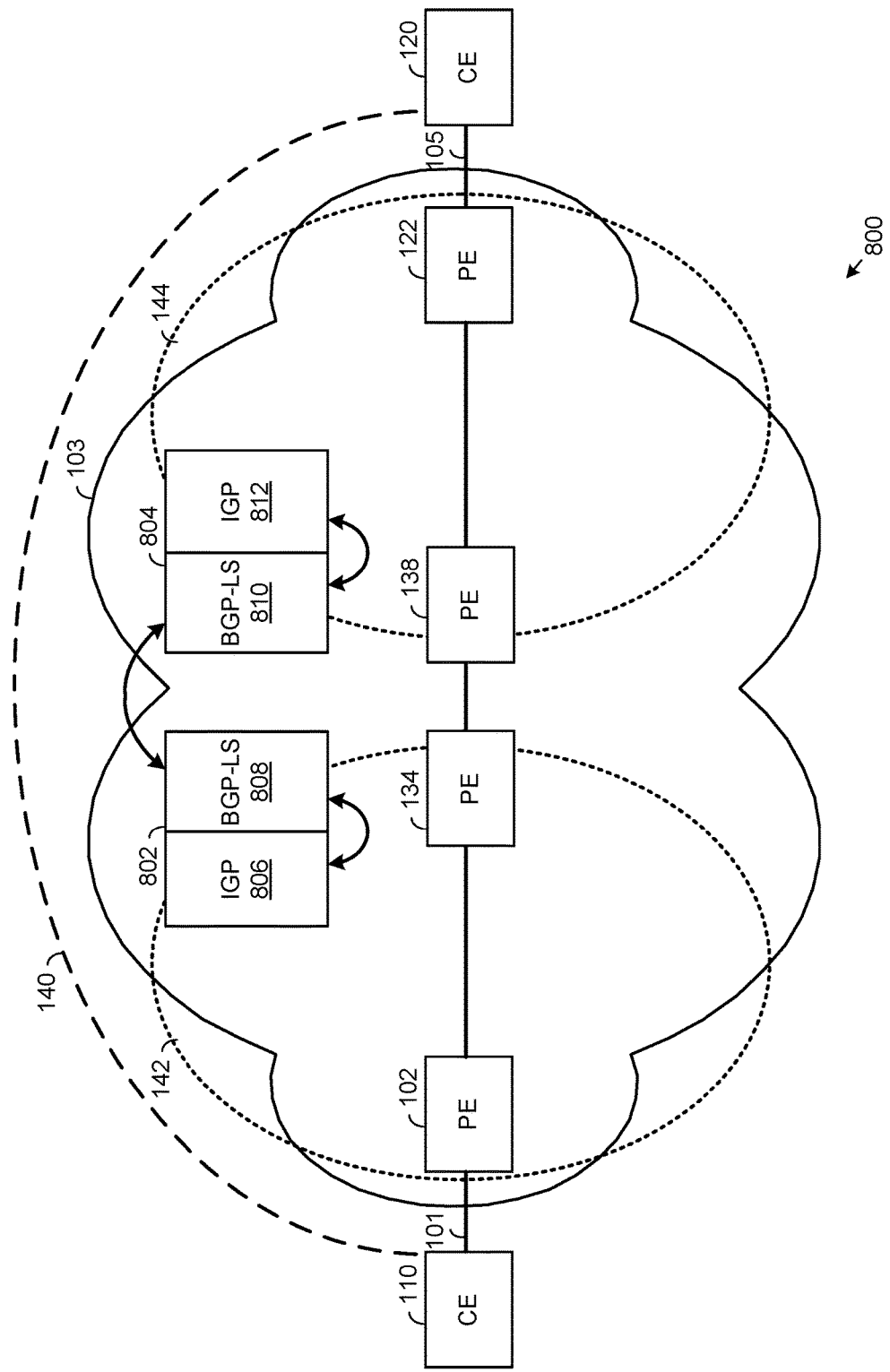
FIG. 8 is a system diagram illustrating the setup and servicing of a pseudowire connection in the context of a packet data network using eBGP edge peering by Route Reflectors according to a described embodiment.

FIG. 8 is a system diagram illustrating the setup and servicing of a pseudowire connection in the context of a packet data network using eBGP edge peering serviced by Route Reflectors of bordering asaccording to a described embodiment. The system 800 of FIG. 8 shares numbering with FIGS. 1 and 6 for common elements. With FIG. 8, PE router 134 of AS 142 and PE router 138 of AS 144 support eBGP (single/multi-hop) peering with BGP-LS AFI/SAFI using route reflectors 802 and 804, respectively. With this embodiment, route reflectors 802 and 804 each support both IGP and BGP-LS. In particular, route reflector 802 of AS 142 supports IGP 806 and BGP-LS 808. Likewise, route reflector 804 of AS 144 supports BGP-LS 810 and IGP 812.

For north-bound distribution of pseudowire data, IGP pseudowire TLVs are passed from IGP 806 to BGP-LS NLRIs of BGP-LS 808. Such north-bound distribution of LS information is consistent with that specified in RFC 7752 but modified according to the present disclosure. The route reflector 802 may then send a BGP-LS message to route reflector 804. However, LS NLRI information received by route reflector 802 from route reflector 804 in a BGP-LS message must also be passed from BGP-LS 808 to IGP 806 in south-bound distribution. Thus, the present disclosure specifies a generic format for all LS NLRI information but also specifically for pseudowire information in LS NLRIs. With both north-bound and south-bound distribution of pseudowire data, pseudowire TLVs are passed between route reflectors 802 and 804 so that the pseudowire data is available at both PE router 102 and PE router 122 to support end-to-end pseudowire operation.

Figure 9A:
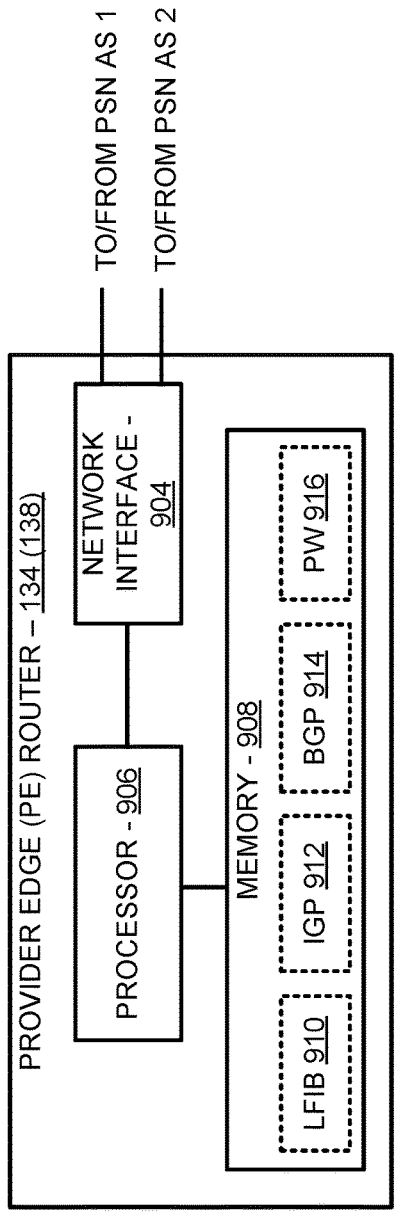
FIG. 9A is a block diagram illustrating a PE router constructed according to a described embodiment.

FIG. 9A is a block diagram illustrating a PE router constructed according to a described embodiment. The PE router 134 (or 138) includes a network interface 904 configured to communicate with multiple PSNs of differing ASs 142 and AS 144 (not shown). By way of example and not limitation, network interface 904 may be a packet over SONET interface or any other interface suitable for connecting to a PSN. Network interface 904 may be a single port interface or a multiport interface. The Network interface 904 includes at least one receiver (receiving unit) and at least one transmitter (transmitting unit).

PE router 134 also includes processor 906 for executing programs stored in local memory 908 and for reading and writing data from/to local memory 908. By way of example and not limitation, processor 906 may be a central processing unit, a microcontroller, a digital signal processor, an application specific integrated circuit, a Judging unit, a Determining Unit, an Executing unit, combinations of any of the foregoing, or any other device suitable for execution of computer programs. By way of example, local memory 908 may store LFIB 910 that includes message forwarding information and pseudowire data 916. Further, local memory 908 may store computer programs for implementing IGP 912 and BGP-LS 914 as previously described herein. Local memory 908 may also store other computer programs, configuration information, and other short-term and long-term data necessary for implementation of the embodiments of the present disclosure. By way of example and not limitation, local memory 908 may be dynamic memory, static memory, disk drive(s), flash drive(s), combinations of any of the foregoing, or any other form of computer memory.

Figure 9B:
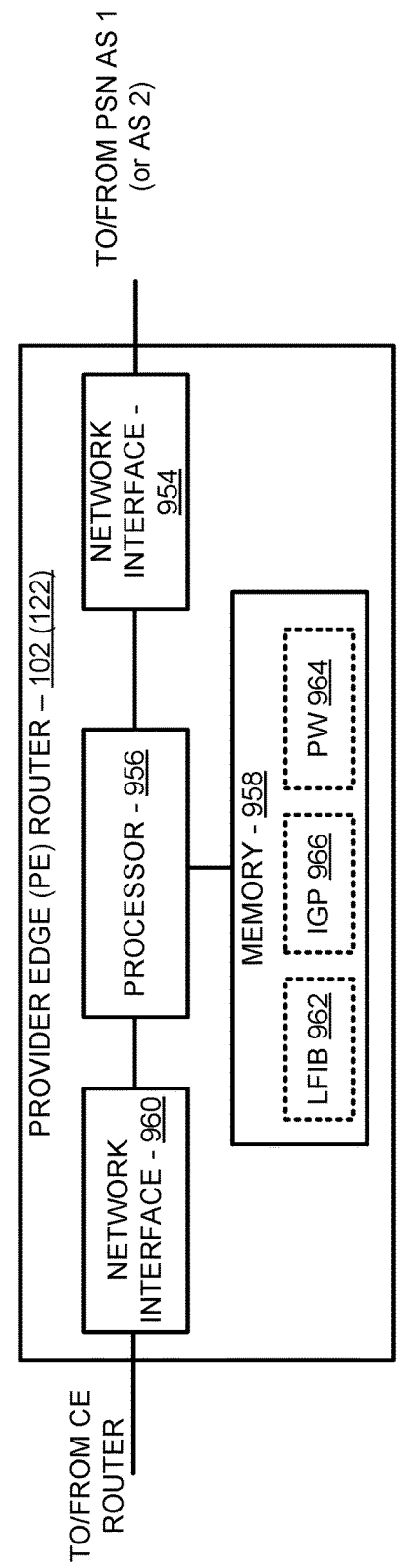
FIG. 9B is a block diagram illustrating another PE router constructed according to a described embodiment.

FIG. 9B is a block diagram illustrating another PE router constructed according to a described embodiment. The PE router 102 (or 122) includes a network interface 960 configured to communicate with a CE router (not shown) and network interface 954 configured to communicate with a PDN 103 of AS 142 or AS 142 (not shown). By way of example and not limitation, network interface 960 may be an Ethernet interface or any other interface suitable for connecting to other network components, and network interface 954 may be a packet over SONET interface or any other interface suitable for connecting to a PSN. Network interfaces 954 and 960 may be single port interfaces or multiport interfaces.

PE router 134 also includes processor 956 for executing programs stored in local memory 958 and for reading and writing data in local memory 958, the construct consistent with similar elements of FIG. 9A. Local memory 958 may store LFIB 962 and pseudowire data 964 and may store computer programs for implementing IGP 966 as previously described herein.

According to one aspect of the present disclosure, there is provided a method for servicing a pseudowire communication that includes: receiving, by a first Provider Edge (PE) router, a first Interior Gateway Protocol (IGP) message from a source PE router, the source PE router and the first PE router associated with a first administrative system (AS), the first IGP message including pseudowire data and identifying a destination PE router that is associated with a second AS, creating, by the first PE router, a first Border Gateway Protocol Link State (BGP-LS) message that includes the pseudowire data, transmitting, by the first PE router, the first BGP-LS message to a second PE router that is associated with the second AS, receiving, by the first PE router, a second BGP-LS message from the second PE router that includes modified pseudowire data, creating, by the first PE router, a second IGP message based upon the second BGP-LS message that includes the modified pseudowire data, and transmitting, by the first PE router, the second IGP message to the source PE router.

According to another aspect of the present disclosure, there is provided a method for servicing a pseudowire communication that includes: receiving, by a destination Provider Edge (PE) router that is associated with a second Administrative System (AS), a first Interior Gateway Protocol (IGP) message from a PE router that is associated with the second AS, the first IGP message including pseudowire data, extracting, by the destination PE router, the pseudowire data from the first IGP message, determining, by the destination PE router from the pseudowire data, that a source PE router that is associated with a first AS is different from the PE router that is associated with the second AS, creating, by the destination PE router, a second IGP message that includes modified pseudowire data that identifies the destination PE router, and transmitting, by the destination PE router, the second IGP message directed to the PE router.

According to yet another aspect of the present disclosure, there is provided a PE router that includes: a network interface configured to communicate with a packet data network, memory, and a processor coupled with the network interface and the memory. According to this aspect, at least one of the network interface, the memory or the processor is configured to: receive a first Interior Gateway Protocol (IGP) message from a source PE router, the source PE router and the PE router associated with a first administrative system (AS), the first IGP message including pseudowire data and identifying a destination PE router that is associated with a second AS, create a first Border Gateway Protocol Link State (BGP-LS) message that includes the pseudowire data, transmit the first BGP-LS message to a second PE router that is associated with the second AS, receive a second BGP-LS message from the second PE router that includes modified pseudowire data, create a second IGP message based upon the second BGP-LS message that includes the modified pseudowire data, and transmit the second IGP message to the source PE router.

According to still another aspect of the present disclosure, there is provided a PE router that includes: a first network interface configured to communicate with a packet data network of a second Administrative System (AS), a second network interface configured to communicate with Customer Equipment (CE), memory, and a processor coupled with the first network interface, and the memory, wherein at least one of the first network interface, the memory, or the processor is configured to: receive a first Interior Gateway Protocol (IGP) message from a second PE router that is associated with the second AS, the request including pseudowire data, extract the pseudowire data from the first IGP message, determine, from the pseudowire data, that a source PE router that is associated with a first AS is different from the second PE router, create a second IGP message that includes modified pseudowire data that identifies the PE router, and transmit the second IGP message directed to the second PE router and intended for the source PE router.

Optionally, in any of the preceding aspects, the first, the second or another BGP-LS message may have Network Layer Reachability Information (NLRI) that includes the pseudowire data.

Optionally, in any of the preceding aspects, a PE router may transmit the first BGP-LS message to the second PE router using External Border Gateway Protocol (eBGP) peering and the first PE router may receive the modified pseudowire data from the second PE router using eBGP peering.

Optionally, in any of the preceding aspects, the first PE router may transmit the first BGP-LS message to the second PE router via a first BGP Route Reflector (RR) of the first AS and a second BGP RR of the second AS and the first PE router may receive the second BGP-LS message from the second PE router via the second BGP RR of the second AS and the first BGP RR of the first AS.

Optionally, in any of the preceding aspects, the source PE router supports first Customer Equipment (CE) and the destination PE router supports second CE.

Optionally, in any of the preceding aspects, the destination PE router determines from the pseudowire data, that the source PE router is different from the PE router by extracting a status bit from the pseudowire data, and determining, from the status bit that the source PE router is different from the PE router.

Optionally, in any of the preceding aspects, the destination PE router determines from the pseudowire data, that the source PE router is different from the PE router by extracting an IP address of the source PE router from the pseudowire data, and comparing the IP address of the source PE router to the IP address of the PE router.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the disclosure is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for servicing a pseudowire communication, the method comprising:
    receiving, by a first Provider Edge (PE) router, a first Interior Gateway Protocol (IGP) message from a source PE router, the source PE router and the first PE router associated with a first administrative system (AS), the first IGP message including pseudowire data and identifying a destination PE router that is associated with a second AS;
    creating, by the first PE router, a first Border Gateway Protocol Link State (BGP-LS) message that includes the pseudowire data of the first IGP message;
    transmitting, by the first PE router, the first BGP-LS message to a second PE router that is associated with the second AS;
    receiving, by the first PE router, a second BGP-LS message from the second PE router that includes modified pseudowire data that identifies the destination PE router;
    creating, by the first PE router, a second IGP message based upon the second BGP-LS message that includes the modified pseudowire data; and
    transmitting, by the first PE router, the second IGP message to the source PE router.

2. The method of claim 1, wherein the modified pseudowire data comprises the pseudowire data as modified by the destination PE router.

3. The method of claim 1, wherein the first BGP-LS message carries Network Layer Reachability Information (NLRI) that includes the pseudowire data.

4. The method of claim 1, wherein the second BGP-LS message carries Network Layer Reachability Information (NLRI) that includes the modified pseudowire data.

5. The method of claim 1, wherein:
the first PE router transmits the first BGP-LS message to the second PE router using External Border Gateway Protocol (eBGP) peering; and
the first PE router receives the second BGP-LS message from the second PE router using eBGP peering.

6. The method of claim 1, wherein:
the first PE router transmits the first BGP-LS message to the second PE router via a first BGP Route Reflector (RR) of the first AS and a second BGP RR of the second AS; and
the first PE router receives the second BGP-LS message from the second PE router via the second BGP RR of the second AS and the first BGP RR of the first AS.

7. The method of claim 1, wherein:
the source PE router supports first Customer Equipment (CE); and
the destination PE router supports second CE.

8. A method for servicing a pseudowire communication, the method comprising:
receiving, by a destination Provider Edge (PE) router that is associated with a second Administrative System (AS), a first Interior Gateway Protocol (IGP) message from a PE router that is associated with the second AS, the first IGP message including pseudowire data;
extracting, by the destination PE router, the pseudowire data from the first IGP message;
determining, by the destination PE router from the pseudowire data, that a source PE router that is associated with a first AS is different from the PE router that is associated with the second AS;
creating, by the destination PE router, a second IGP message that includes modified pseudowire data that identifies the destination PE router; and
transmitting, by the destination PE router, the second IGP message directed to the PE router.

9. The method of claim 8, wherein determining, by the destination PE router from the pseudowire data, that the source PE router is different from the PE router comprises:
extracting a status bit from the pseudowire data; and
determining, from the status bit that the source PE router is different from the PE router.

10. The method of claim 8, wherein determining, by the destination PE router from the pseudowire data, that the source PE router is different from the PE router comprises:
extracting an IP address of the source PE router from the pseudowire data; and
comparing the IP address of the source PE router to the IP address of the PE router.

11. The method of claim 8, wherein:
the source PE router supports first Customer Equipment (CE); and
the destination PE router supports second CE.

12. A provider edge (PE) router comprising:
a network interface configured to communicate with a packet data network;
memory; and
a processor coupled with the network interface and the memory, wherein at least one of the network interface, the memory or the processor is configured to:
receive a first Interior Gateway Protocol (IGP) message from a source PE router, the source PE router and the PE router associated with a first administrative system (AS), the first IGP message including pseudowire data and identifying a destination PE router that is associated with a second AS;
create a first Border Gateway Protocol Link State (BGP-LS) message that includes the pseudowire data of the first IGP message;
transmit the first BGP-LS message to a second PE router that is associated with the second AS;
receive a second BGP-LS message from the second PE router that includes modified pseudowire data that identifies the destination PE router;
create a second IGP message based upon the second BGP-LS message that includes the modified pseudowire data; and
transmit the second IGP message to the source PE router.

13. The PE router of claim 12, wherein the first BGP-LS message carries Network Layer Reachability Information (NLRI) that includes the pseudowire data.

14. The PE router of claim 12, wherein the second BGP-LS message carries Network Layer Reachability Information (NLRI) that includes the modified pseudowire data.

15. The PE router of claim 12, wherein at least one of the network interface, memory, or router are further configured to:
transmit the first BGP-LS message to the second PE router using External Border Gateway Protocol (eBGP) peering; and
receive the second BGP-LS message from the second PE router using eBGP peering.

16. The PE router of claim 12, wherein at least one of the network interface, memory, or router are further configured to:
transmit the first BGP-LS message to the second PE router via a first BGP Route Reflector (RR) of the first AS and a second BGP RR of the second AS; and
receive the second BGP-LS message from the second PE router via the second BGP RR of the second AS and the first BGP RR of the first AS.

17. A provider edge (PE) router comprising:
a first network interface configured to communicate with a packet data network of a second Administrative System (AS);
a second network interface configured to communicate with Customer Equipment (CE);
memory; and
a processor coupled with the first network interface, and the memory, wherein at least one of the first network interface, the memory or the processor is configured to:
receive a first Interior Gateway Protocol (IGP) message from a second PE router that is associated with the second AS, the first IGP message including pseudowire data;
extract the pseudowire data from the first IGP message;
determine, from the pseudowire data, that a source PE router that is associated with a first AS is different from the second PE router;
create a second IGP message that includes modified pseudowire data that identifies the PE router; and
transmit the second IGP message directed to the second PE router and intended for the source PE router.

18. The PE router of claim 17, wherein at least one of the first network interface, the memory, or the processor is configured to determine, from the pseudowire data, that the source PE router that is associated with the first AS is different from the second PE router by:
extracting a status bit from the pseudowire data; and determining, from the status bit that the source PE router is different from the second PE router.

19. The PE router of claim 17, wherein at least one of the first network interface, the memory or the processor is configured to determine, from the pseudowire data, that the source PE router that is associated with the first AS is different from the second PE router by:
   extracting an IP address of the source PE router from the pseudowire data; and
   comparing the IP address of the source PE router to the IP address of the second PE router.

20. The PE router of claim 17, wherein at least one of the second network interface, the memory, or the processor is configured to service a pseudowire connection with the CE.

* * * * *